United States Patent
Truong et al.

(10) Patent No.: US 11,211,753 B2
(45) Date of Patent: Dec. 28, 2021

(54) POINT OF SALE CABLES

(71) Applicant: HEWLETT-PACKARD DEVELOPMENT COMPANY, L.P., Houston, TX (US)

(72) Inventors: Binh T. Truong, Houston, TX (US); James McClellan, Houston, TX (US); Matthew William Tivnon, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 36 days.

(21) Appl. No.: 16/076,757

(22) PCT Filed: Jun. 22, 2017

(86) PCT No.: PCT/US2017/038743
§ 371 (c)(1),
(2) Date: Aug. 9, 2018

(87) PCT Pub. No.: WO2018/236378
PCT Pub. Date: Dec. 27, 2018

(65) Prior Publication Data
US 2021/0184408 A1    Jun. 17, 2021

(51) Int. Cl.
| | |
|---|---|
| *H01R 24/64* | (2011.01) |
| *G06F 1/26* | (2006.01) |
| *G07G 1/00* | (2006.01) |
| *H01R 13/627* | (2006.01) |
| *G06Q 20/20* | (2012.01) |
| *G07G 1/14* | (2006.01) |

(52) U.S. Cl.
CPC .............. *H01R 24/64* (2013.01); *G06F 1/26* (2013.01); *G07G 1/0018* (2013.01); *H01R 13/6277* (2013.01); *G06Q 20/20* (2013.01); *G07G 1/14* (2013.01); *H01R 2201/04* (2013.01)

(58) Field of Classification Search
CPC ................ H01R 24/64; H01R 13/6277; H01R 2201/04; G06F 1/26; G07G 1/0018; G07G 1/14; G06Q 20/20
USPC ............ 439/502, 623, 498, 505; 705/16–18; 235/383, 379, 380
See application file for complete search history.

(56) References Cited

U.S. PATENT DOCUMENTS

| | | |
|---|---|---|
| 5,923,709 A | 7/1999 | Keel et al. |
| 8,463,430 B2 | 6/2013 | Segal et al. |

(Continued)

OTHER PUBLICATIONS

"Configuration Guide HP Point of Sale (POS) Accessories", HP, Retrieved from Internet—http://www.capsupport.com/drivers/axiom_hp/HP%20POS%20Configuration%20Guide.pdf, May 2006, 27 Pages.

(Continued)

*Primary Examiner* — Abdullah A Riyami
*Assistant Examiner* — Justin M Kratt
(74) *Attorney, Agent, or Firm* — Brooks Cameron Huebsch PLLC

(57) ABSTRACT

Example implementations relate to point of sale cables. For example, a system may comprise a point of sale terminal coupled to a splitter via a registered jack (RJ) cable to provide electrical power to the splitter, a receipt printer coupled to receive electrical power from the splitter at a DIN connector input, and a cash drawer to receive electrical power from the splitter via an RJ connector input.

14 Claims, 4 Drawing Sheets

(56) References Cited

U.S. PATENT DOCUMENTS

| | | | |
|---|---|---|---|
| 8,898,076 B2 | 11/2014 | Vasquez et al. | |
| 2003/0040222 A1* | 2/2003 | Price | H01R 12/721 |
| | | | 439/638 |
| 2007/0257109 A1* | 11/2007 | Johansen, Jr. | G07F 7/0833 |
| | | | 235/383 |

OTHER PUBLICATIONS

"How to Connect a Epson Printer and Cash Drawers to uniCenta POS", Retrieved from internet—http://www.beaglehardware.com/howtounicenta.html, 2013, 5 Pages.

"Port Pin Outs", Retrieved from internet—https://www.transact-tech.com/support-info.php?id=155, 2017, 4 Pages.

"Thermal Receipt Printer Operating Manual", Xiamen Rongta Technology Co. Ltd , Retrieved from Internet—https://www.restomax.com/wp-content/uploads/2015/08/rongta-thermal-printer.pdf, 2015, 12 Pages.

* cited by examiner

POINT OF SALE CABLES

BACKGROUND

Point of sale and/or point of purchase devices can include point of sale terminals that can include a computing device and/or a display for recording a plurality of items to be purchased. In some examples, the point of sale terminals can be coupled to a receipt printer to print a copy of the plurality of items to be purchased. In some examples, the point of sale terminals can be coupled to a cash drawer that can be opened if change is due to a customer during a cash transaction.

DETAILED DESCRIPTION

Point of sale systems can provide point of sale services. For example, point of sale systems can be utilized to log purchases, calculate purchase totals, provide paper receipts for the purchases, and/or open a locked cash drawer when change is needed for cash purchases. In some examples, the point of sale systems can include a point of sale terminal. The point of sale terminal can include a computing device and/or a display. The point of sale terminal can be communicatively coupled and/or electrically coupled to a number of receipt printers and/or a number of cash drawers via a number of point of sale cables as described herein.

As described further herein, the point of sale cables can include a registered jack (RJ) cable comprising a first end with an RJ12 connector and a second end with a Deutsches Institut für Normung (DIN) connector. In some examples, the RJ12 connector can be utilized to connect to an RJ output of a point of sale terminal. In some examples, the DIN connector can be utilized to connect to a DIN power input of a receipt printer for the point of sale terminal.

In some examples, the point of sale cables described herein can be longer than previous point of sale cables, which can be helpful for setting up various point of sale system configurations. In some examples, the point of sale cables described herein can provide electrical power from the point of sale terminal to receipt printers, cash drawers, and/or other peripheral devices utilized in a point of sale system.

Figure 1:
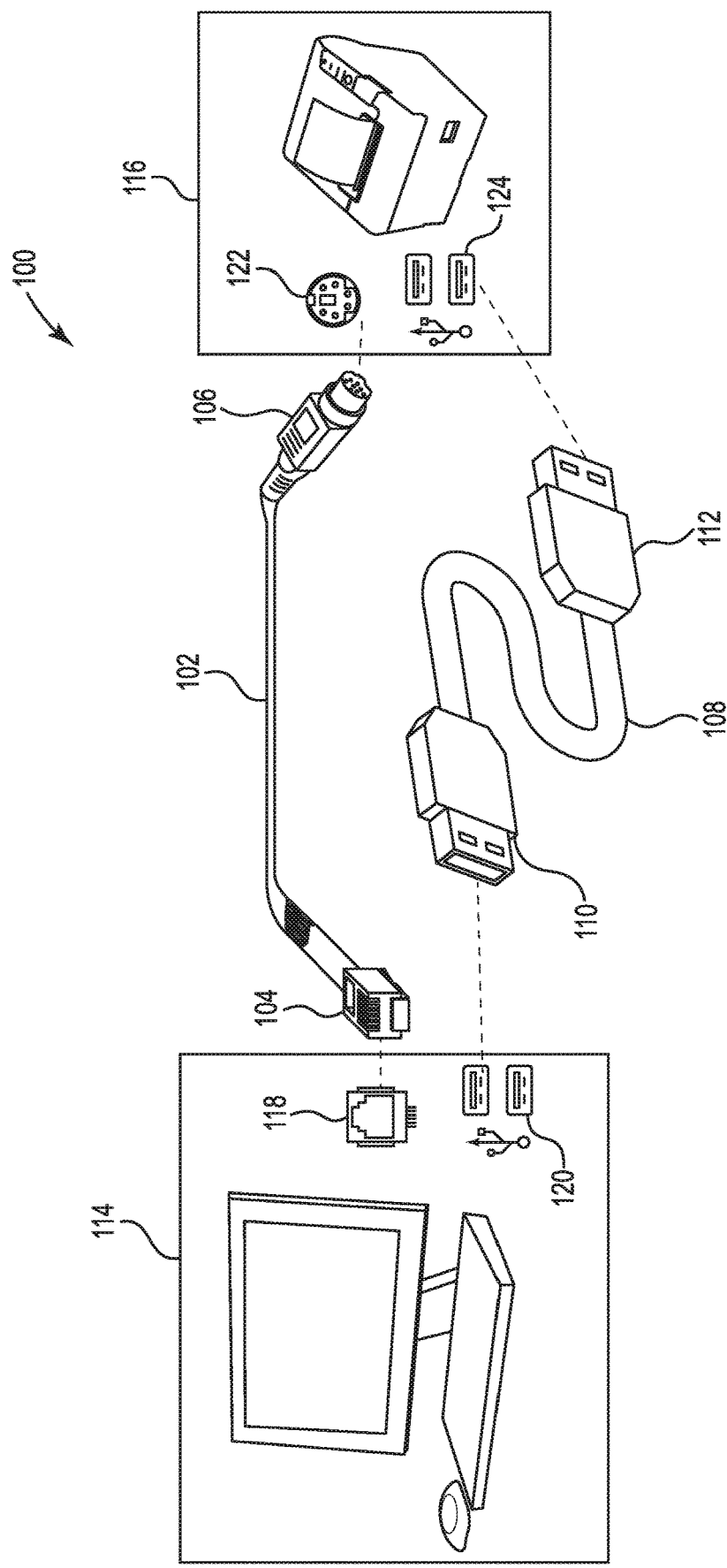
FIG. 1 illustrates an example of a system for point of sale cables, in accordance with the present disclosure.

FIG. 1 illustrates an example of a system 100 for point of sale cables, in accordance with the present disclosure. In some examples, the system 100 can be a point of sale system that includes a point of sale terminal 114 connected to a receipt printer 116 via a point of sale cable 102 and/or a universal serial bus (USB) cable 108. In some examples, the USB cable 108 can include a first end with a USB connector 110 that can be coupled to a USB input 120 of the point of sale terminal 114 and a second end with a USB connector 112 coupled to a USB input 124 of the receipt printer 116. In some examples, the point of sale terminal 114 can provide electrical power to the receipt printer 116 via the point of sale cable 102.

In some examples, the point of sale terminal 114 can include a computing device. For example, the point of sale terminal 114 can include a processing resource (e.g., hardware processor, logic, etc.) that can execute instructions stored on a non-transitory computer readable medium. In some examples, the point of sale terminal 114 can include a display that can be utilized to display items to be purchased, display a total cost for the items to be purchased, and/or display change due to a customer upon purchase of the items. In some examples, the point of sale terminal 114 can utilize the receipt printer 116 to print out a copy of details of a transaction.

In some examples, the system 100 can include a point of sale cable 102. The point of sale cable 102 can be an RJ cable. As used herein, an RJ cable can be an electrical cable that can be connected to a RJ connector (e.g., RJ connector 104, etc.). For example, the RJ cable can be a cable that includes a plurality of electrical wires that can be connected to a six position, six contacts (6P6C) RJ connector. In some examples, the RJ cable can be a cable comprising four electrical wires that can be connected to particular pins of the RJ connector.

In some examples, the wires of the point of sale cable 102 can be altered for the RJ connector 104 and/or the DIN connector 106. For example, a number of pins of the RJ connector 104 can be altered or routed based on an electrical configuration of the point of sale terminal 114 and/or receipt printer 116. In some examples, a #4 pin, a #6 pin, and/or a #1 pin can be altered to a receipt printer 116 power line of the DIN connector 106. In some examples, the DIN connector 106 can include a routed direct current pin, a routed chassis ground pin, and a routed ground pin from the RJ connector 104 of the cable to the DIN connector 106. In some examples, the DIN connector 106 can be in reference of the hosiden connector and/or Powered USB components that consist of a Host-side PCB connector, a Host-side Cable-end Plug, a PoweredUSB Cable (Bulk), a Peripheral-side Cable-end Plug, and/or a Peripheral-side PCB Connector.

In some examples, the point of sale cable 102 can include a first end that can include an RJ connector 104. In some examples, the RJ connector 104 can be an RJ12 connector. In some examples, the first end of the point of sale cable 102 can be connected to an RJ connector output 118 of the point of sale terminal 114. In some examples, the point of sale cable 102 can include a second end that can include a DIN connector 106. In some examples, the DIN connector 106 can be a mini-DIN connector or other type of DIN connector that can be connected to a DIN input 122 of the receipt printer 116.

In some examples, the DIN input 122 of the receipt printer 116 can be an input for connecting the receipt printer 116 to an alternating current (AC) socket. For example, a power cord for the receipt printer 116 can include an AC connector to connect an AC socket. In this example, the power cord can include an electrical converter to convert the AC power to direct current (DC) power. In this example, the power cord can include a DIN connector to provide the DC power to the receipt printer 116. In some examples, the power cord can provide power to the receipt printer 116 with an additional cable and an additional AC socket.

The point of sale cable 102 can be utilized to provide power to the receipt printer 116 from the point of sale terminal 114 instead of from an additional AC socket. In some examples, the point of sale cable 102 can be longer than previous point of sale cables. For example, previous point of sale cables can include a different type of connection that can transfer both data and power between a point of sale terminal and a receipt printer, but have restrictions of length and also may not be capable of splitting as described further herein.

Figure 2:
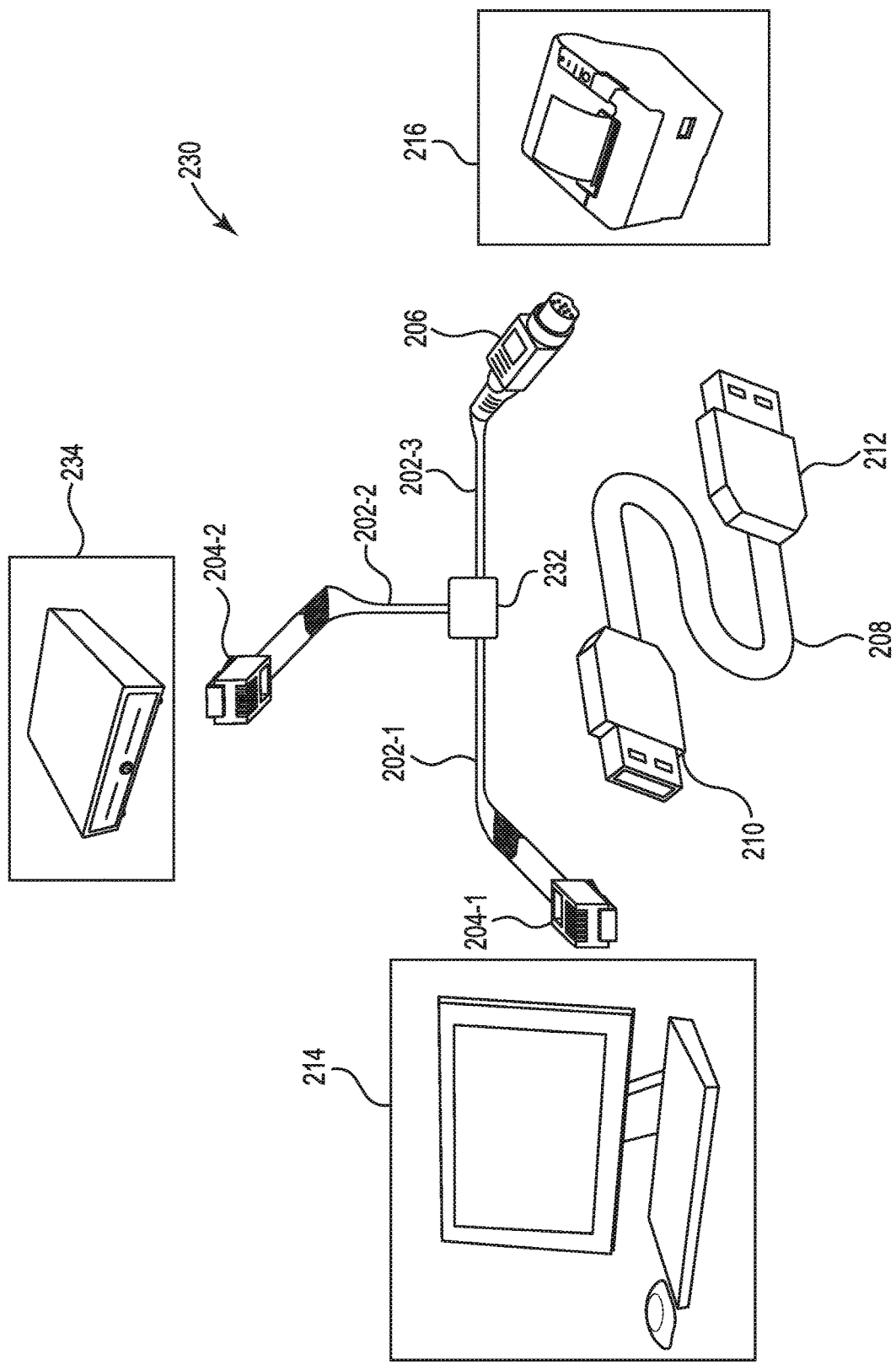
FIG. 2 illustrates an example of a system for point of sale cables, in accordance with the present disclosure.

FIG. 2 illustrates an example of a system 230 for point of sale cables, in accordance with the present disclosure. In some examples, the system 230 can be a point of sale system that includes a point of sale terminal 214 connected to a receipt printer 216 and a cash drawer 234 via a number of point of sale cables 202-1, 202-2, 202-3 and/or a number of universal serial bus (USB) cables 208. In some examples, the USB cable 208 can include a first end with a USB connector 210 that can be coupled to a USB input of the point of sale terminal 214 and a second end with a USB connector 212 coupled to a USB input of the receipt printer 216. In some examples, the point of sale terminal 214 can provide electrical power to the receipt printer 216 and the cash drawer 234 via the point of sale cables 202-1, 202-2, 202-3.

In some examples, the point of sale terminal 214 can include a computing device. For example, the point of sale terminal 214 can include a processing resource (e.g., processor, logic, etc.) that can execute instructions stored on a non-transitory computer readable medium. In some examples, the point of sale terminal 214 can include a display that can be utilized to display items to be purchased, display a total cost for the items to be purchased, and/or display change due to a customer upon purchase of the items. In some examples, the point of sale terminal 214 can utilize the receipt printer 216 to print out a copy of details of a transaction and utilize the cash drawer 234 to store currency.

In some examples, the system 230 can include a number of point of sale cables 202-1, 202-2, 202-3. The point of sale cables 202-1, 202-2, 202-3 can be RJ cables. As used herein, an RJ cable can be an electrical cable that can be connected to a RJ connector (e.g., RJ connector 204-1, RJ connector 204-2, etc.). For example, the RJ cable can be a cable that includes a plurality of wires that can be connected to a six position, six contacts (6P6C) RJ connector. In some examples, the RJ cable can be a cable comprising four electrical wires that can be connected to particular pins of the RJ connector.

In some examples, the point of sale cable 202-1 can include a first end that can include an RJ connector 204-1. In some examples, the RJ connector 204-1 can be an RJ12 connector. In some examples, the first end of the point of sale cable 202-1 can be connected to an RJ connector output of the point of sale terminal 214. In some examples, the point of sale cable 202-1 can include a second end that can include a RJ connector that is coupled to a splitter 232. In some examples, the splitter 232 can be an RJ connector splitter that can receive an RJ connector from the second side of the point of sale cable 202-1. In some examples, the splitter 232 can include a plurality of outputs that can receive RJ connectors that are connected to a plurality of peripheral devices (e.g., receipt printer 216, cash drawer 234, additional receipt printers, additional cash drawers, etc.). For example, the splitter 232 can include a first output that can receive an RJ connector of point of sale cable 202-2 and a second output that can receive an RJ connector of point of sale cable 202-3. In this example, point of sale terminal 214 can simultaneously provide power to the receipt printer 216 and the cash drawer 234 via the splitter 232.

In some examples, the point of sale cable 202-2 can include a first end with an RJ connector that is coupled to an output of the splitter 232 and a second end that can include an RJ connector 204-2 that can be coupled to the cash drawer 234. In some examples, the point of sale cable 202-3 can include a first end with an RJ connector that is coupled to an output of the splitter 232 and a second end that can include a DIN connector 206. In some examples, the DIN connector 206 can be a mini-DIN connector or other type of DIN connector that can be connected to a DIN input of the receipt printer 216.

In some examples, the DIN input of the receipt printer 216 can be an input for connecting the receipt printer 216 to an alternating current (AC) socket. For example, a power cord for the receipt printer 216 can include an AC connector to connect to an AC socket. In this example, the power cord can include an electrical converter to convert the AC power to direct current (DC) power. In this example, the power cord can include a DIN connector to provide the DC power to the receipt printer. In some examples, the power cord can provide power to the receipt printer 216, but with an additional cable and an additional AC socket.

The system 230 can be utilized to provide power to the receipt printer 216 and the cash drawer 234 from the point of sale terminal 214 instead of from additional AC sockets. In some examples, the point of sale cables 202-1, 202-2, 202-3 can be longer than previous point of sale cables. For example, previous point of sale cables can include a different type of connection that can transfer both data and power between a point of sale terminal and a receipt printer, but have restrictions of length and also may not be capable of utilizing a splitter 232.

Figure 3:
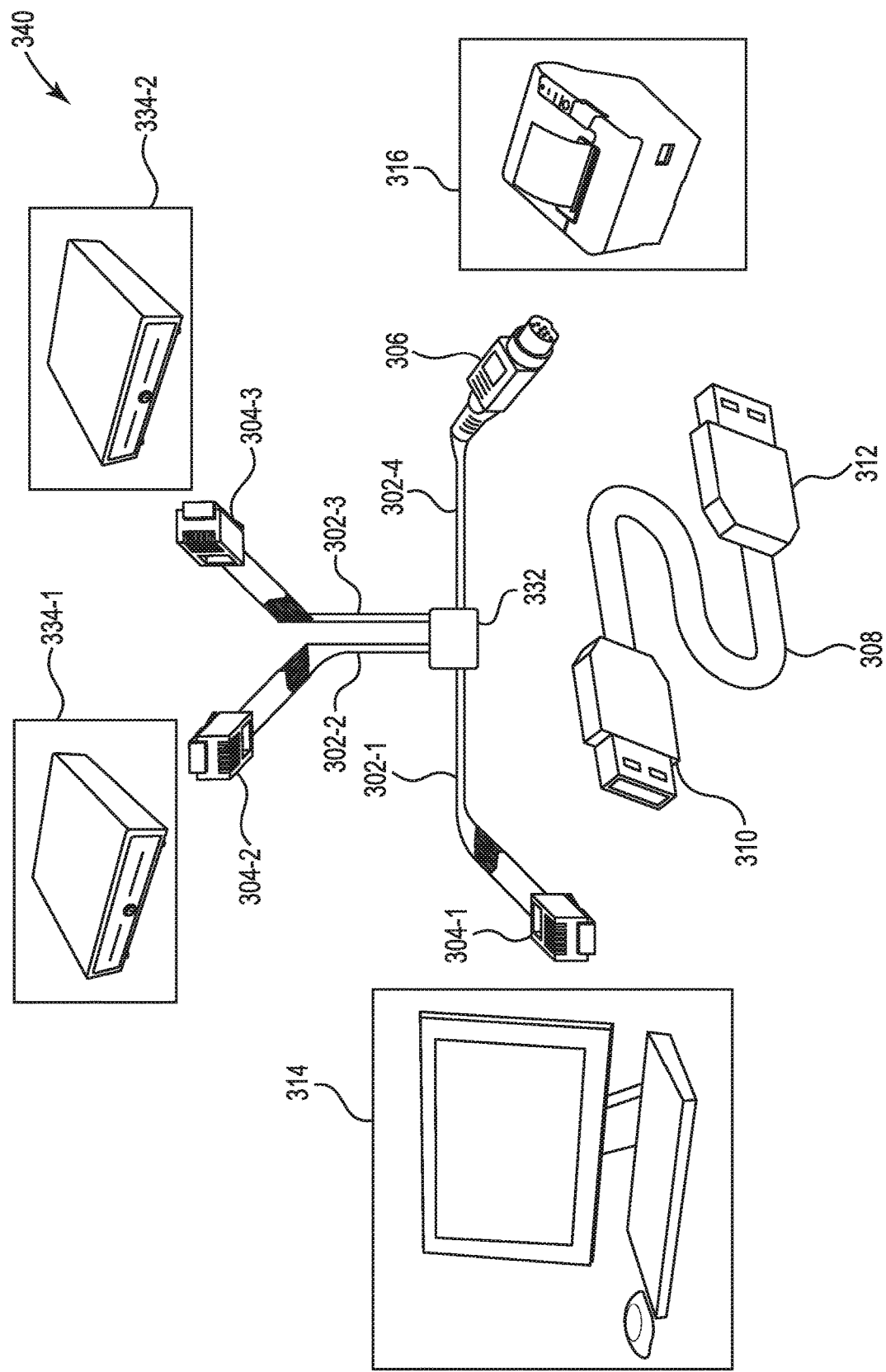
FIG. 3 illustrates an example of a system for point of sale cables, in accordance with the present disclosure.

FIG. 3 illustrates an example of a system for point of sale cables, in accordance with the present disclosure. In some examples, the system 340 can be a point of sale system that includes a point of sale terminal 314 connected to a receipt printer 316, a first cash drawer 334-1, and a second cash drawer 334-2 via a number of point of sale cables 302-1, 302-2, 302-3, 302-4 and/or a number of universal serial bus (USB) cables 308. In some examples, the USB cable 308 can include a first end with a USB connector 310 that can be coupled to a USB input of the point of sale terminal 314 and a second end with a USB connector 312 coupled to a USB input of the receipt printer 316. In some examples, the point of sale terminal 314 can provide electrical power to the receipt printer 316, the first cash drawer 334-1, and the second cash drawer 334-2 via the point of sale cables 302-1, 302-2, 302-3, 302-4.

In some examples, the point of sale terminal 314 can include a computing device. For example, the point of sale terminal 314 can include a processing resource (e.g., processor, logic, etc.) that can execute instructions stored on a non-transitory computer readable medium. In some examples, the point of sale terminal 314 can include a display that can be utilized to display items to be purchased, display a total cost for the items to be purchased, and/or display change due to a customer upon purchase of the items. In some examples, the point of sale terminal 314 can utilize the receipt printer 316 to print out a copy of details of a transaction, utilize the first cash drawer 334-1 to store a first type of currency, and the second cash drawer 334-1 to store a second type of currency. In some examples, the first type of currency can be currency from a first country or government entity and the second type of currency can be currency from a second country or government entity that is different than the first.

In some examples, the system 340 can include a number of point of sale cables 302-1, 302-2, 302-3, 302-4. The point of sale cables 302-1, 302-2, 302-3, 302-4 can be RJ cables. As used herein, an RJ cable can be an electrical cable that can be connected to an RJ connector (e.g., RJ connector 304-1, RJ connector 304-2, RJ connector 304-3, etc.). For example, the RJ cable can be a cable that includes a plurality of wires that can be connected to a six position, six contacts (6P6C) RJ connector. In some examples, the RJ cable can be a cable comprising four electrical wires that can be connected to particular pins of the RJ connector.

In some examples, the point of sale cable 302-1 can include a first end that can include an RJ connector 304-1. In some examples, the RJ connector 304-1 can be an RJ12 connector. In some examples, the first end of the point of sale cable 302-1 can be connected to an RJ connector output of the point of sale terminal 314. In some examples, the point of sale cable 302-1 can include a second end that can include a RJ connector that is coupled to a splitter 332. In some examples, the splitter 332 can be an RJ connector splitter that can receive an RJ connector from the second side of the point of sale cable 302-1. In some examples, the splitter 332 can include a plurality of outputs that can receive RJ connectors that are connected to a plurality of peripheral devices (e.g., receipt printer 316, first cash drawer 334-1, second cash drawer 334-2, etc.). For example, the splitter 332 can include a first output that can receive an RJ connector of point of sale cable 302-2, a second output that can receive an RJ connector of point of sale cable 302-3, and a third output that can receive an RJ connector of point of sale cable 302-4. In this example, point of sale terminal 314 can simultaneously provide power to the receipt printer 316, the first cash drawer 334-1, and the second cash drawer 334-2 via the splitter 332.

In some examples, the point of sale cable 302-2 can include a first end with an RJ connector that is coupled to an output of the splitter 332 and a second end that can include an RJ connector 304-2 that can be coupled to the first cash drawer 334-1. In some examples, the point of sale cable 302-3 can include a first end with an RJ connector that is coupled to an output of the splitter 332 and a second end that can include an RJ connector 304-3 that can be coupled to the second cash drawer 334-2. In some examples, the point of sale cable 302-4 can include a first end with an RJ connector that is coupled to an output of the splitter 332 and a second end that can include a DIN connector 306. In some examples, the DIN connector 306 can be a mini-DIN connector or other type of DIN connector that can be connected to a DIN input of the receipt printer 316.

In some examples, the DIN input of the receipt printer 316 can be an input for connecting the receipt printer 316 to an alternating current (AC) socket. For example, a power cord for the receipt printer 316 can include an AC connector to connect to an AC socket. In this example, the power cord can include an electrical converter to convert the AC power to direct current (DC) power. In this example, the power cord can include a DIN connector to provide the DC power to the receipt printer. In some examples, the power cord can provide power to the receipt printer 216, but with an additional cable and an additional AC socket.

The system 340 can be utilized to provide power to the receipt printer 316, the first cash drawer 334-1, and the second cash drawer 334-2 from the point of sale terminal 314 instead of from additional AC sockets. In some examples, the point of sale cables 302-1, 302-2, 302-3, 302-4 can be longer than previous point of sale cables. For example, previous point of sale cables can include a different type of connection that can transfer both data and power between a point of sale terminal and a receipt printer, but have restrictions of length and also may not be capable of utilizing a splitter 332.

Figure 4:
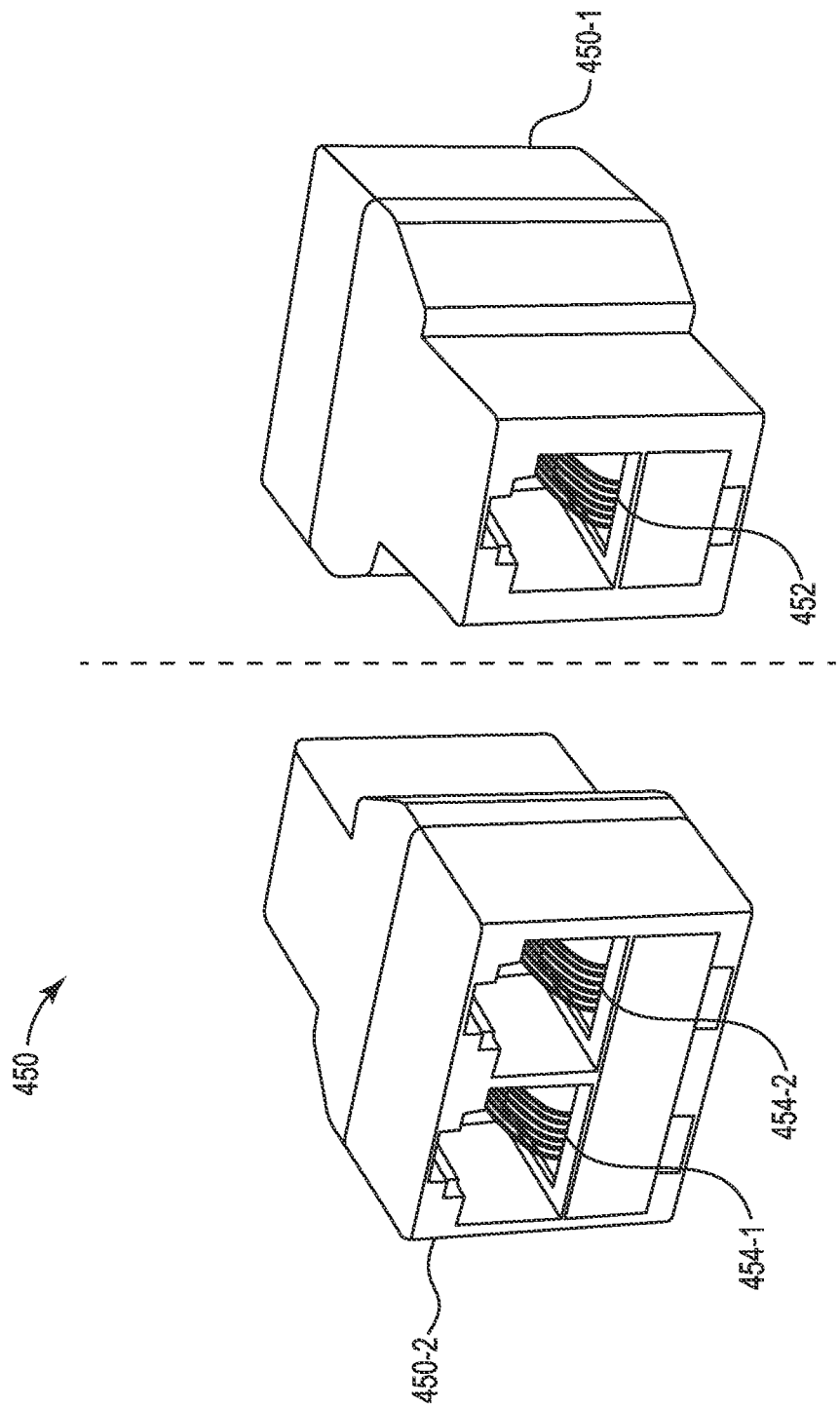
FIG. 4 illustrates an example of a splitter device, in accordance with the present disclosure.

FIG. 4 illustrates an example of a splitter device 450, in accordance with the present disclosure. FIG. 4 illustrates the splitter device 450 from a first side and a second side. For example, FIG. 4 illustrates an input side 450-1 and an output side 450-2. In some examples, the splitter device 450 can be utilized to split point of sale cables as described herein. For example, the splitter device 450 can be utilized as a splitter 232 as referenced in FIG. 2 and/or splitter 323 as referenced in FIG. 3.

In some examples, the splitter device 450 can include an RJ input 452 and/or a plurality of RJ outputs 454-1, 454-2. Two RJ outputs 454-1, 454-2 are illustrated in FIG. 4, but examples are not so limited. For example, the splitter device 450 can include additional or fewer RJ outputs 454-1, 454-2. In some examples, the splitter device 450 can be utilized to receive a plurality of RJ12 connectors as described herein. For example, the splitter device 450 can accept an RJ12 connector from a point of sale cable coupled to a point of sale terminal via the RJ input 452. In this example, the splitter device 450 accept an RJ12 connector from a first point of sale cable coupled to a receipt printer via the first RJ output 454-1. In this example, the splitter device 450 accept an RJ12 connector from a second point of sale cable coupled to a cash drawer via the first RJ output 454-2.

The splitter device 450 can receive power from the point of sale terminal via the RJ input 452 and provide power to a plurality of peripheral devices via the plurality of RJ outputs 454-1, 454-2. As described herein, previous point of sale cables may not be capable of utilizing a splitter device 450. In addition, the previous point of sale cables may not be capable of extending as far as the point of sale cables described herein.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. A system, comprising:
    a point of sale terminal coupled to a splitter via a first registered jack (RJ) cable to provide electrical power to the splitter;
    a receipt printer connected to the splitter via a cable that includes a first end with an RJ connector and a second end with a DIN connector and coupled to the splitter via the DIN connector to receive electrical power from the splitter at a DIN connector input of the receipt printer; and a cash drawer to receive electrical power from the point of sale terminal via the splitter via a second RJ cable.

2. The system of claim 1, comprising an additional cash drawer coupled to the splitter to receive electrical power from the splitter via an additional RJ cable.

3. The system of claim 1, comprising an additional receipt printer coupled to the splitter via an additional cable, the additional cable including a first end with an RJ connector and a second end with a DIN connector and coupled to the splitter via the DIN connector of the additional cable to receive electrical power from the point of sale terminal via the splitter at a DIN connector input of the additional receipt printer.

4. The system of claim 1, wherein the splitter includes an RJ connector input to receive power from the point of sale terminal and a plurality of RJ connector outputs to provide power to a plurality of devices.

5. The system of claim 4, wherein the plurality of devices include a plurality of receipt printers and a plurality of cash drawers.

6. The system of claim 1, wherein the cash drawer is connected to the splitter via the second RJ cable that includes a first end with a first RJ connector and a second end with a second RJ connector.

7. A point of sale system, comprising:
a point of sale terminal including a registered jack (RJ) output for providing power to a receipt printer;
the receipt printer including a DIN input for receiving power from the point of sale terminal;
an RJ splitter connected to the point of sale terminal and the receipt printer via a cable, wherein the RJ splitter includes an RJ output; and
the cable comprising a first end with an RJ connector to connect to the RJ output of the point of sale terminal and a second end with a DIN connector to connect to the DIN input of the receipt printer such that the point of sale terminal is to provide the power to the receipt printer through the cable via the RJ splitter.

8. The point of sale system of claim 7, wherein the cable is connected to the RJ output of the RJ splitter.

9. The point of sale system of claim 7, wherein the RJ output of the RJ splitter includes a plurality of RJ outputs.

10. The point of sale system of claim 7, wherein the RJ connector is an RJ12 connector.

11. The point of sale system of claim 7, wherein the DIN connector includes a routed direct current pin, a routed chassis ground pin, and a routed ground pin from the RJ connector of the cable to the DIN connector.

12. A system, comprising:
a point of sale terminal including a registered jack (RJ) output to power a receipt printer and a universal serial bus (USB) output to transmit data to the receipt printer;
an RJ splitter connected to the point of sale terminal and a receipt printer via an RJ cable;
the receipt printer including a DIN input for receiving power from the point of sale terminal and a USB input for receiving data from the point of sale terminal;
an RJ cable comprising a first end with an RJ12 connector to connect to the RJ output of the point of sale terminal and a second end with a DIN connector to connect to the DIN input of the receipt printer such that the point of sale terminal is to provide power to the receipt printer through the RJ cable via the RJ splitter; and
a USB cable comprising a first end with a first USB connector connected to the USB output of the point of sale terminal and a second end with a second USB connector connected to the USB input of the receipt printer.

13. The system of claim 12, wherein power is provided to the receipt printer through the RJ cable and data is transmitted to the receipt printer through the USB cable.

14. The system of claim 13, wherein the RJ cable and the USB cable are separate cables.

* * * * *